United States Patent [19]

Blaschke

[11] 4,335,444
[45] Jun. 15, 1982

[54] MULTIPLE PULSE-WIDTH MULTIPLIER

[75] Inventor: Felix Blaschke, Erlangen, Fed. Rep. of Germany

[73] Assignee: Siemens Aktiengesellschaft, Munich, Fed. Rep. of Germany

[21] Appl. No.: 148,141

[22] Filed: May 9, 1980

[30] Foreign Application Priority Data

May 16, 1979 [DE] Fed. Rep. of Germany ....... 2919786

[51] Int. Cl.³ .............................................. G06G 7/22
[52] U.S. Cl. .................................... 364/815; 364/817; 364/841
[58] Field of Search ............... 364/815, 816, 817, 818, 364/841

[56] References Cited

U.S. PATENT DOCUMENTS

| | | | |
|---|---|---|---|
| 2,880,935 | 4/1959 | Johnson | 364/818 |
| 2,927,734 | 3/1960 | Vance | 364/817 |
| 3,473,011 | 10/1969 | Schmid | 364/815 |
| 3,671,731 | 6/1972 | Denoncourt et al. | 364/818 |
| 3,825,738 | 7/1974 | Blaschke et al. | 364/817 |
| 4,250,559 | 2/1981 | Blaschke | 364/815 |

Primary Examiner—Charles E. Atkinson
Attorney, Agent, or Firm—Kenyon & Kenyon

[57] ABSTRACT

For forming $$a = \sum_i b_i \cdot c_i$$

in a pulse width multiplier, two input voltages $b_i$ are summed at the input of an inverter and are added, after each passes through a separate switch and proportional stage, at the input of a smoothing stage, to the inverter output signal. The switches are actuated by switching pulses which are width-modulated in accordance with the factors $c_i$. The calculated sum is present at the output of the smoothing stage. Great accuracy in field-oriented control of rotating-field machines is possible when vector analyzers and vector rotators designed in this manner are used.

9 Claims, 4 Drawing Figures

MULTIPLE PULSE-WIDTH MULTIPLIER

BACKGROUND OF THE INVENTION

This invention relates to a pulse-width multiplier in which an input voltage corresponding to the first factor of a product can be switched, with alternating sign, to a smoothing stage, by means of a switch and an inverter. The switch is actuated by width-modulated pulses representing the second factor of the product.

A multiplier of this type, for forming an output $U_a=(x/y)\cdot z$ from the input voltages x, y, z is commercially available (Time-Division-Multiplier Type EL 1/299.02 of Siemens AG, Price List RE 1, May, 1972, pages 6/33 to 36). In this unit, the input voltage z is applied to the input of a smoothing stage via a first double-throw switch, alternating between directly coupled (at switching time $t_1$) and, via an inverter, with reversed sign (at switching time $t_2$). The switch is actuated by means of pulses which are formed from the input voltage x and y, in such a manner that $(t_1-t_2)/(t_1+t_2)=x/y$, so that an output voltage $U_a=z\cdot x/y$ is present at the output of the smoothing stage (by principle of pulse-width multiplication). A sawtooth generator, a limit indicator (two-level device), and a second double-throw switch are provided for forming the switching pulses. The second double-throw switch passes the input voltage y either directly or, via a further inverter, in alternation, and is switched simultaneously with the switching pulses for the first double-throw switch. To generate the sawtooth waveforms employed, the input voltage x and the output signal y' of the second double-throw switch are fed to the inverter input of an I-stage (integrating amplifier). The output voltage $y'=\pm y$ of the double-throw switch is also applied to the limit indicator as a limit, and the output signal of the limit indicator operates the second double-throw switch as soon as the auxiliary voltage furnished by the I-stage reaches the limit y. After the second double-throw switch is switched into the position $y'=+y$, the curve of the auxiliary voltage therefore increases linearly through integration of the input variables $(x+y)$ until it reaches the limit $+y$ after the time $t_1$. Then the double-throw switch is switched to the position $y'=-y$ and the auxiliary voltage curve decreases linearly during the switching time $t_2$, corresponding to the input variables $(x-y)$ of the I-stage. For the switching time $t_1$ and $t_2$ of the two double-throw switches, the condition $x/y=(t_1-t_2)/(t_1+t_2)$ is thereby achieved. This known multiplier contains 6 potentiometers for balancing and normalizing.

Such pulse-width multipliers are distinguished by great accuracy. However, as soon as several such multipliers are required for certain applications, for instance, in controls, the expenditures for switching elements and adjusting labor increase. Furthermore, such pulse-width multipliers are intended for multiplying constant input quantities. With variable inputs, distortions in time can occur through the smoothing stage. This happens, for instance, if machines must be controlled as a function of the positions of rotating machine parts, and if the inputs, variable in time, corresponding to the machine positions, must be multiplied and added together for the analog control, where the individual factors of the products to be added are time-dependent in common. If such a pulse-width multiplier were used for forming each product, superpositions and beats would occur through the addition of the output signals of the individual smoothing stages; these can be avoided only when the time relationships of the individual smoothing stages are carefully matched to each other. However, since only discrete capacity values with considerable manufacturing tolerances are available for the capacitors required for the smoothing stages, conventional pulse-width multipliers are not suitable for such purposes. Thus, in German Pat. No. 19 42 312, for instance, characteristic-multipliers are used for control of an asynchronous machine.

It is an object of the present invention to describe an analog computing circuit for calculating a sum $$a = \sum_i b_i \cdot c_i$$

of products of the input voltages $b_i$ and $c_i$, which requires a minimum amount of components and adjusting labor, which is designed for processing quantities which vary in time, and which operates according to the principle of pulse-width multiplication.

SUMMARY OF THE INVENTION

The problem set forth above is solved by a multiplier of the general type described at the outset, in which a common smoothing stage, preceded by a junction point, is provided for all products formed. For all products the input voltages corresponding to the associated first factor of each product are connected to a common inverter, and the inverter output is connected to the junction point. At the same time, the input voltages corresponding to the first factor of a product are likewise applied to the junction point via separate switches (one switch for each product), which can be operated by switching pulses representing the second factor of the corresponding product and via a proportional stage. The total to be calculated is taken off at the ouput of the smoothing stage. If an operational amplifier is used for smoothing, then the proportional stage is formed by appropriate resistors placed in the input leads to the amplifier. Since, according to the invention, a single smoothing stage is used for smoothing all products, input voltages which are variable in time can be processed without the danger of distortion which could be caused by the superposition of signals of several smoothing stages; such stages are difficult to match to each other. It is merely necessary, as is generally the case when pulse-width multipliers are used, for the computing frequency, i.e., the frequency of the corresponding switches, to be substantially higher than the frequency of the time-varying input voltages. Moreover, the junction point required for adding the individual products can be located at the input of an operational amplifier connected as a smoothing stage, obviating a separate summing operational amplifier as well as an output inverter such as is frequently required in such summing amplifiers for establishing the correct polarity of the output signal. In addition, the amount of circuitry is also reduced by replacing the switching inverter, required for the formation of each product in the known circuit, by a common inverter.

In some applications, especially for controlling rotating machines, it is necessary to form two sums, $$a_1 = \sum_i b_i c_i \text{ and } a_2 = \sum_i b_i c_i',$$

especially $a_1 = b \cdot c + d \cdot e$ and $a_2 = b \cdot f + d \cdot g$. Application of the teachings of the invention makes possible the formation of these sums simultaneously without appreciable cost, since only a second smoothing stage, a second proportional stage, and a set of further switches, for instance further switches are required for forming the second sum. Thus, the output voltage of a first inverter, required for forming the first product, is fed, via a second proportional stage, to a second junction point at the input of a second smoothing stage. Further, the input voltages corresponding to the original first factor b and the new first factor d are each fed, by additional switches, actuated in accordance with the further factors f and g. The two sums to be computed are present as output voltages at the outputs of the two smoothing stages.

Of special importance here is the case $f = -e$, $g = c$. For, if the quantities c and e stand for $\cos\phi$ and $\sin\phi$ of an angle $\phi$, then the computing circuit makes it possible to represent a vector a which is given by the coordinates b and d with respect to a Cartesian coordinate system, according to the equations $$a_1 = b \cdot \cos\phi + d \cdot \sin\phi$$

$$a_2 = -b \cdot \sin\phi + d \cdot \cos\phi \tag{1}$$

in a coordinate system restated, relative to the original coordinate system, by the angle. Thereby, a vector, the coordinates of which are determined in a rotating machine, for instance, by corresponding measured values in the stationary coordinate system, can be transformed to a coordinate system rotating with the machine. Also the reverse transformation $$a_1 = b \cdot \cos\phi - d \cdot \sin\phi$$

$$a_2 = b \cdot \sin\phi + d \cdot \cos\phi \tag{2}$$

from a rotating coordinate system to a stationary coordinate system is easily possible.

For the coordinate transformations, the circuit having two smoothing stages can be used and the switches required for representing $\cos\phi$, in the products $b \cdot \cos\phi$ and $d \cdot \cos\phi$, are actuated by the same switching pulses. For representing $-\sin\phi$ in the product $-b \cdot \sin\phi$, the switching pulses already required for forming $d \cdot \sin\phi$ can be used, except that the opening and the closing of the switch must be reversed; this is realized, in the illustrative embodiment, by inserting a NOR stage in the responding switching pulse line.

The circuit of the invention can be used to advantage for determining the position and/or magnitude of a rotating vector, such as the magnetic flux vector in a rotating-field machine, relative to another, stationary, coordinate system, obtained, for instance, from measurements at the stator of the machine, are set in the circuit as inputs. Such an application, as well as the principle of the invention, is explained in greater detail in the illustrative embodiments which follow:

DETAILED DESCRIPTION OF THE INVENTION

The illustrative embodiment relates to a field-oriented control for an asynchronous machine. The currents flowing in the stator windings of such a machine can be added up to form a stator vector current i, the coordinates of which, in a stator-related coordinate system, are given by appropriate measurements, Likewise, the coordinates of the magnetic flux vector $\Psi$ can be determined from stator variables (currents and voltages).

Figure 1:
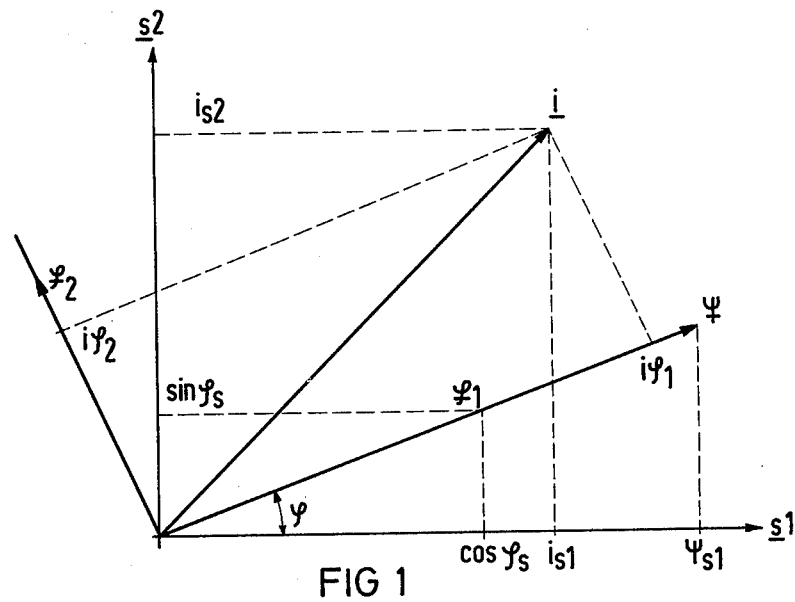
FIG. 1 shows the position of a vector in two coordinate systems which are rotated relative to each other.

According to German Pat. No. 19 41 312, (U.S. Pat. No. 3,824,437) the asynchronous machine can be controlled or regulated by making the stator current dependent on two electrical variables which are fieldaxis-related variables. For this purpose, the stator current vector is split into a component parallel to the magnetic flux vector and a component perpendicular thereto, i.e., the stator current is represented in a Cartesian system which rotates with the magnetic flux vector. The current component parallel to the field determines the magnitude of the field, and the component perpendicular to the field determines the torque of the machine. In FIG. 1, the stator-related coordinate system is designated using subscripts $s_1$ and $s_2$ and the field-oriented coordinate system with $\phi_1$ and $\phi_2$. Thus, $i_{s1}$ and $i_{s2}$ are the stator-related components and $i_{\phi1}$ and $i_{\phi2}$ are the field-related components of the current vector and $\phi$ is the angle between the field vector $\Psi$ or the corresponding unit vector $\phi_1$ and the vector $s_1$.

The problem is to calculate the component of a vector parallel and perpendicular to a reference vector, where the vector and the reference vector are given by their coordinates in an associated Cartesian coordinate system. Since the reference vector rotates and the vector changes its position, relative to the reference vector, the inputs to be fed to the computing circuit are variable in time, but this variation is slow as compared to the operating frequency of the computing circuit.

First, the corresponding coordinates of the unit vector must be determined from the stator-related coordinates of the magnetic flux vector, in order to determine the position of the new coordinate system, i.e., the angle $\phi$. This purpose is served, in the structure of FIG. 2, by a vector analyzer such as is described in U.S. Pat. No. 3,671,731. There, the inputs $\Psi_{s1}$ and $\Psi_{s2}$ are first divided by the amount of the vector $\Psi$ and then the divider outputs are multiplied in multipliers 4 and 5 by the inputs $\Psi_{s1}$ and $\Psi_{s2}$, so that the quantity $\Psi^2_{s1}/\Psi + \Psi^2_{s2}/\Psi$ is present at an additive junction point 6. This variable $\Psi$, which can be taken off at junction point 6, is fed to the divisor inputs of dividers 2 and 3.

The quantity $\Psi_{s1}/\Psi = \cos \phi_s$ is therefore present at the output of divider 2 and can be taken off at an output 8. At a corresponding output 7, the quantity $\Psi_{s2}/\Psi = \sin \phi_s$ is brought out from the output of divider 3.

After this analysis of the reference vector $\Psi$, the vector rotator i is now transformed in a vector 10 such as is shown, for instance, in FIG. 6 of the mentioned German Pat. No. 19 41 312. This coordinate transformation is accomplished according to the above known formulas (1):

$$i_{\phi 1} = i_{s1} \cos \phi_s + i_{s2} \sin \phi_s$$

$$i_{\phi 2} = -i_{s1} \sin \phi_s + i_{s2} \sin \phi_s \quad (3)$$

Figure 2:
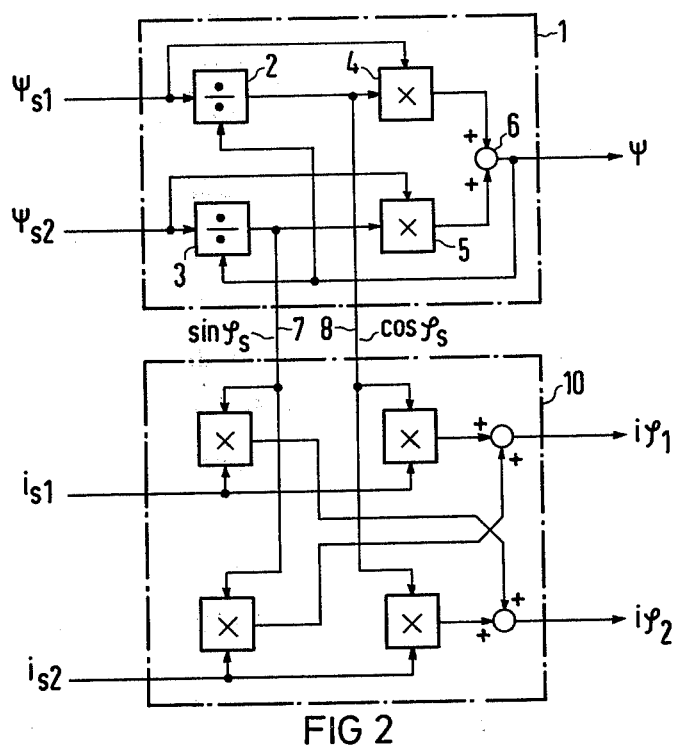
FIG. 2 is a block diagram of an arrangement for transforming the coordinates of the vector from one coordinate system into the other coordinate system.

Since pulse-width multiplication can be performed with great accuracy, it would be desirable to realize the circuit of the block diagram of FIG. 2 using pulse-width multipliers.

Figure 3:
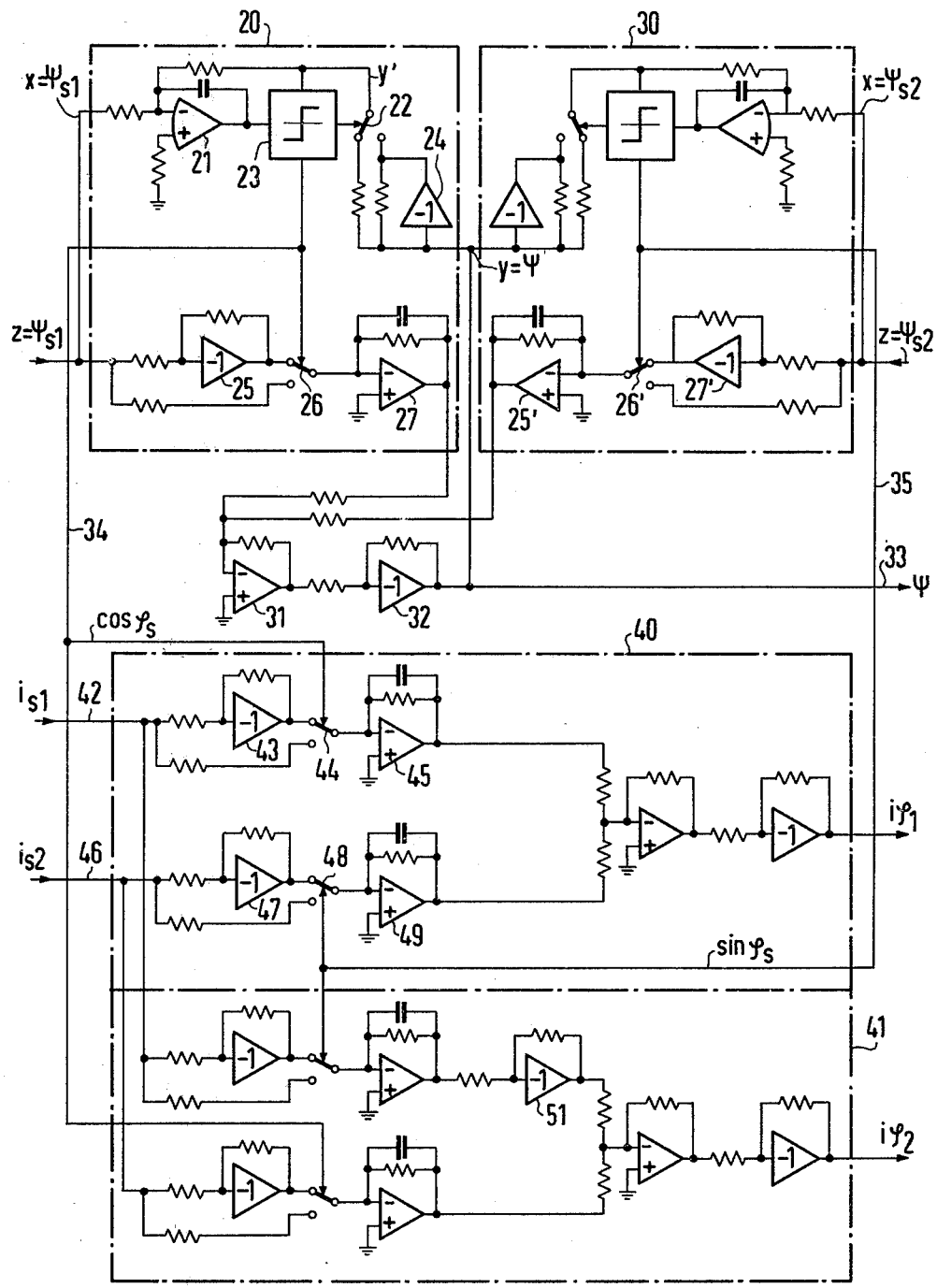
FIG. 3 is a schematic diagram of a circuit realizing the block diagram of FIG. 2 with elements in accordance with the prior art.

In FIG. 3, the prior art pulse-width multiplier, mentioned above, is shown as 20. The input to unit 20, and the output of a first double-throw switch 22 are connected to a first input of an I-stage (inverting stage) 21. The I-stage output is connected to a limit indicator 23 which delivers a binary output signal and changes its signal as soon as the voltage fed from the I-stage is equal to the voltage $y' = \pm y$. The binary output signal is fed back from the output of double-throw switch 22. The output signal of limit indicator 23 actuates double-throw switch 22 which switches the y-input from the voltage being applied directly to an equal voltage of opposite polarity, derived via an inverter 24. The voltage at the z-input to unit 20 is made available directly, or via an inverter 25, to a second double-throw switch 26, and thence to a smoothing stage 27, driven in synchronism with first switch 22 by limit indicator 23. During the time $t_1$, the voltage z is passed on directly through the switch, and, during the time $t_2$, it is passed on with the opposite sign, so that smoothing stage 27 forms a mean value $U_a = (z \cdot t_1 - z \cdot t_2)/(t_1 + t_2)$. Since, for the times $t_1$ and $t_2$, $(t_1 - t_2)/(t_1 + t_2) = x/y$, the voltage $z \cdot x/y$ is present at the output 28 of pulse-width multiplier 20. In the present application, $y = \Psi$ and $x = z = \Psi_{s1}$ are fed in, where the same symbols are chosen for the individual defining quantities of the vectors and for the corresponding voltages.

Pulse-width multiplier 20 therefore corresponds to the combination of divider 2 and multiplier 4 in FIG. 2 for forming the quantity $\Psi_{s1}^2/\Psi$. A pulse-width multiplier 30 of completely identical design is used for forming $\Psi_{s2}^2/\Psi$. The output signals of both pulse-width multipliers are then summed in adding stage 31 followed by an inverter 32 to obtain a DC voltage $\Psi = (\Psi_{s1}^2 + \Psi_{s2}^2)/\Psi$, which is applied to the y-inputs of the two pulse-width multipliers and can, in addition, be taken off at an output 33. The quantities $\cos \phi_s = \Psi_{s1}/\Psi$ and $\sin \phi_s = \Psi_{s2}/\Psi$ are formed here, not as DC voltages, but are brought out as pulse trains (rectangular curve), for instance, of "high" and "low" signals from the vector analyzer.

These pulse trains can now be used for pulse-width multiplication in vector rotator 40. A double-multiplier is used for forming $i_{\phi 1} = i_{s1} \cdot \cos \phi_s + i_{s2} \sin \phi_2$. The voltage $i_{s1}$, which is applied in an analogous manner, with alternating polarity, to smoothing stage 45 by means of an inverter 43 and a double-throw switch 44, is fed to an input 42. Double-throw switch 44 is actuated by the pulse train representing the variable $\cos \phi_s$ via line 34. In smoothing stage 45, the first product is therefore formed by averaging over the voltages $+i_{s1}$ and $-i_{s1}$, weighted in accordance with the switching pulse durations $t_1$ and $t_2$.

The second product is formed from the input voltage $i_{s2}$ present at input 46 by means of a further inverter 47, a further double-throw switch 48 (actuated, via the line 35, by the switching pulses representing the variable $\sin \phi_s$) and smoothing stage 49. Both products are subsequently added. Since the smoothing stages and the adders are advantageously constructed using operational amplifiers, a subsequent inverter for providing the correct sign is necessary.

A second double-multiplier 41 for forming $i_{\phi 2} = -i_{s1} \sin \phi_s + i_{s2} \cos \phi_s$ can be constructed in exactly the same manner, the inputs of which for $i_{s1}$ and $i_{s2}$, and for $\sin \phi_s$ and $\cos \phi_s$ are likewise connected to lines 42, 46 and 34, 35, respectively. An additional inverter 51 is necessary for representing the negative sign.

Such a design makes it possible to calculate the product sums with great accuracy. Two switching pulse generators are sufficient. Such a switching pulse generator contains, as described, a limit indicator 23 with a binary output signal, into which a sawtooth voltage curve and an auxiliary voltage (in this case, $y' = \pm \Psi$) are set and which always changes its output signal when the sawtooth voltage curve coincides with the auxiliary voltage.

The inputs $\Psi_{s1}$ and $\Psi_{s2}$ as well as $i_{s1}$ and $i_{s2}$ are time-dependent according to the frequency of the rotating-field machine. These time dependences largely cancel out in the formation of the product sums and the resulting variables $\Psi$ or $i_{e1}$ and $i_{e2}$ are time-dependent to a much lesser degree. If, now, the smoothing stages (for instance, 43 and 47), required for forming a sum, are not carefully matched to each other, then beats can occur, upon addition at the input of the following summing amplifiers, which simulate a false time dependence. Further superpositions can be produced if two sawtooth generators operating with different frequencies are used.

In the circuit of the present invention, the product sums are formed in a computing circuit 60 (FIG. 4) which takes the place of components 25, 26, 27, 25', 26', 27', 31 and 32 in the prior art circuit of FIG. 3. For forming the sum $\Psi_{s1} \cos \phi_s + \Psi_{s2} \sin \phi_2$, only a single smoothing stage is used, advantageously an operational amplifier 61 having a feedback branch which consists of a shunt-connected resistor and capacitor. The input of operational amplifier 61 is a first junction point 62 which sums the input voltages fed to the operational amplifier. The first factors $\Psi_{s1}$ and $\Psi_{s2}$ to be fed to the computing circuit are fed to junction point 62 via a common inverter 63 and series-connected resistor 64. These factors are also fed, via switches 65 and 66 and associated resistors 67 and 68, respectively, to junction point 62, Resistors 67 and 68 are each one-half the resistance value of resistor 64 and act as a proportional stage with a gain of 2. When switches 65 and 66 are closed, the voltages $\Psi_{s1}$ and $\Psi_{s2}$ are therefore added with twice the value to the output of inverter 63, so that during the "on" time ($t_1$) of the switches, the input voltages are present with their original sign and, during the off time, with the opposite sign. Switches 65 and 66 are actuated similarly to switches 26 and 26' of FIG. 3 by switching pulses which effect the pulse-width multiplication by the factors $\cos \phi$ and $\sin \phi$.

The amount of circuitry necessary for computing circuit 60 is compartively small. In particular, it is an advantage that the smoothing of the pulsed voltages takes place in a common smoothing stage only after they have been summed and that the time behavior of the smoothing stage has the same effect for both summands. No interfering beats are produced.

In principle, the switching pulses for switches 65 and 66 can be formed in the same way as they were in FIG.

3. However, the circuit shown in FIG. 4 can also be used to advantage, since it requires only a single sawtooth generator of constant frequency. A sawtooth generator 70 such as is described, for instance, in German Patent Application No. P 29 08 942.7, can be used. This generator consists of a frequency-determining oscillator 71 which applies an input present at input 73 via a double-throw switching device, shown schematically as switch 72, with alternating sign, to an integrator 74. The output signal of integrator 74 is a triangle wave and is fed via a feedback line to a second junction point 75 at the input of switching device 72 via a rectifier, for instance, a full-wave rectifier 76, a smoothing stage 77, a proportional stage 78 and a PI-controller 79. With full-wave rectification, the output signal of smoothing stage 77 corresponds to one-half the amplitude of the triangle voltage. When, therefore, this signal is doubled in proportional stage 78 and compared at the input of PI-controller 79 with the voltage signal present at input 73, the amplitude of the sawtooth voltage is exactly proportional to the input voltage at input terminal 73. In the present case, the output voltage $\Psi$ of computing circuit 60 is fed to input terminal 73.

The sawtooth reference voltage generated in this manner is fed to first and second limit indicators 80 and 81, into which the voltages $\Psi_{s1}$ and $\Psi_{s2}$, respectively, are set as limits. Each of the limit indicators generates a binary signal which changes when the reference voltage curve intersects the respective limit values. These signal sequences (rectangular voltage waves) can serve as switching signals for representing the quantities $\cos \phi_s = \Psi_{s1}/\Psi$ and $\sin \phi_s = \Psi_{s2}/\Psi$. It is also possible to represent the variables $-\cos \phi_s$ and $-\sin \phi_s$ by merely reversing the role of the pulses in closing and opening the respective switches. This can be accomplished by connecting NOR gates 82 and 83 to the outputs of limit indicator 80 and 81, respectively, to invert the value of the binary limit indicator output signals. Since switches 65 and 66 of computing circuit 60 apply input voltages with their original sign to smoothing stage 61 only when limit indicators 80 and 81 respond, i.e., when the reference sawtooth curve is higher than the limits $\Psi_{s1}$ and $\Psi_{s2}$, and since the smoothing stage furnishes the negative mean value of the pulsed input voltages, the respective switching pulses for switches 65 and 66 are taken off at the outputs of NOR gates 82 and 83.

Figure 4:
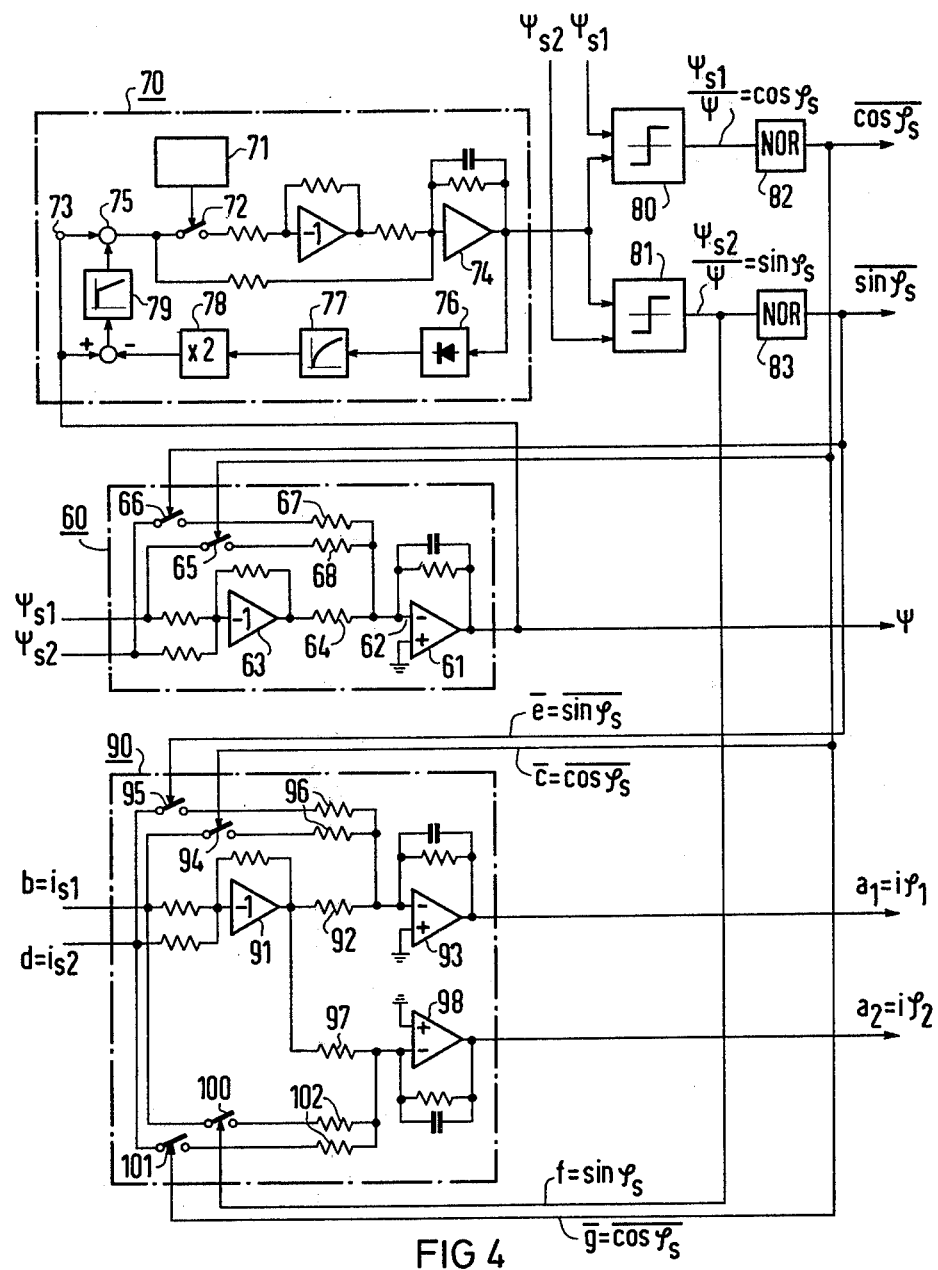
FIG. 4 is a schematic diagram of a circuit realizing the block diagram of FIG. 2, using the teachings of the invention.

To calculate the quantities $i_{\phi 1}$ and $\overline{i_{\phi 2}}$ according to equation (3), the rectangle waves for $\overline{\cos \phi}$ and $\sin \phi$ are multiplied in a vector rotator 90, also shown in FIG. 4, by the input voltages $i_{s1}$ and $i_{s2}$. It is advantageous to build the vector rotator 90 by using the computing circuit taught by the present invention. First, the sum $a_1 = b \cdot c + d \cdot e$ is formed, with the variables $i_{s1}$ and $i_{s2}$ being fed to the inputs for b and d and the variables $\sin \phi_s$ and $\cos \phi_s$ to the inputs for c and e. To this end, the voltages b and d are summed at the input of an inverter 91, in a manner similar to computing circuit 60. The output signal of inverter 91 is fed to a first smoothing stage 93 through a resistor 92. In addition, the voltages b and d are fed, via first and second switches 94 and 95 and associated series resistors 96, to the input of first smoothing stage 93. As before, resistors 96 have one-half the resistance of resistor 92, and act as a proportional stage for doubling the voltages coming from switches 94 and 95 which are additively linked with the voltage coming from inverter 91 at the input to smoothing stage 93. The quantity $a_1 = i_{\phi 1}$ is taken off at the output of first smoothing stage 93.

To represent the quantity $i_{\phi 2}$, a sum $a_2 = b \cdot f + d \cdot g$ must be formed at the same time. This is done by connecting the output signal of inverter 91 to a second smoothing stage 98, via resistor 97. The voltages b and d are further added to the inverter output voltage at the input of second smoothing stage 98 by way of third and fourth switches 100 and 101 and resistors 102. Since resistors 102 again have only one-half the resistance value of resistor 97, they constitute a proportional stage for doubling the applied voltage. The sum is taken off as an output voltage $i_{\phi 2}$ at output a2.

To realize equation (3), switches 94 and 95 are also actuated by the output pulses of NOR gates 82 and 83. Since in this case, we must set $f = -e$ and $g = c$, third switch 100 associated with voltage b is actuated by the complementary signal of the switches signal associated with switch 93, i.e., the necessary reversal of sign is derived, by a logical reversal, from the same output signal of the limit indicator 81. Switches 101 and 94, which are required for representing the factor $\cos \phi_s$ are actuated by the corresponding output signal of limit indicator 80.

Thus, by using common smoothing stages for each sum formation, the occurrence of interfering distortions in time is largely avoided for the vector rotator 90 since all factors of each sum are influenced by the same time behavior of the associated smoothing stage. Time-consuming adjustment work is completely eliminated. It further becomes even more obvious that, with this vector rotator, the amount of circuitry required is considerably reduced by the invention.

The advantages of the computing circuit of the present invention are readily obtained in a vector analyzer or a vector rotator and, to an increased extent, in a circuit composed of both units, and also in other circuits calling for formation of the sum of several products from two factors. Similarly, sums of three or more products can be formed simply in this manner. For the arrangement shown in FIG. 4 it does not matter whether the output $\Psi$ of the circuit is fed back into the sawtooth generator used to form switching pulses in the vector analyzer for forming $\cos \phi_s$ and $\sin \phi_s$ or whether it is determined in some other manner. Also, vector rotator 90 can be used for realizing equation (2) for transforming, for instance, a vector given in the field-oriented system. In such a case, where only the signs of the trigonometric functions need to be interchanged, only the corresponding switching pulses need to be negated.

What is claimed is:

1. Apparatus for calculating a sum of products, each product having two factors, comprising:
    a junction point;
    a smoothing stage having an input coupled to the junction point and having an output at which the sum of the products is taken off;
    an inverter having an output coupled to the junction point and having as inputs a plurality of input voltages, each input voltage corresponding to a first factor of each of the products;
    a plurality of switches, equal in number to the number of products being summed, each switch having an output and each switch having one of the plurality of input voltages as an input;
    means for generating switching pulses proportional to voltages corresponding to the respective second factors of the products, the pulses being coupled as control inputs to the switches; and a proportional stage coupling the output of each switch and of the inverter to the junction point.

2. Apparatus in accordance with claim 1 in which:

the means for generating switching pulses comprise a limit indicator for each voltage representing a second factor, and further comprising:

means for generating a sawtooth voltage proportional to a predetermined value for each limit indicator, each limit indicator having a sawtooth voltage as one input; and means providing a voltage corresponding to the respective second factor as a second input to each limit indicator;

each limit indicator having one of the switching pulses as an output, each limit indicator changing its output signal at the intersection of the sawtooth voltage and the voltage corresponding to the respective second factor to form a binary output signal.

3. Apparatus in accordance with claim 1 in which:

the means for generating the switching pulses comprise a limit indicator for each voltage representing a second factor and further comprising:

means for generating a triangular wave proportional to a predetermined value as an input for all limit indicators; and means providing a voltage which is a fraction of the triangular wave and which is proportional to a respective second factor as a second input to each indicator;

each limit indicator having one of the switching pulses as an output and each limit indicator changing its output signal at the intersection of the triangular voltage and the voltage corresponding to the respective second factor.

4. Apparatus in accordance with any one of claims 1, 2 and 3 and further comprising means for simultaneously calculating a second sum of two products, the products of the second sum having the same first factors as the products of the first sum, comprising:

a second junction point;

a second smoothing stage having an input coupled to the second junction point and having an output at which the second sum of products is taken off;

a second plurality of switches, equal in number to the first factors of the products, each switch having an output and each switch having one of the plurality of voltages corresponding to the first factor as an input;

means for generating switching pulses proportional to at least one voltage corresponding to at least one second factor of the products, the switching pulses being coupled as control inputs to the switches; and a second proportional stage coupling the output of each switch of the second plurality and the output of the second inverter to the second junction point.

5. Apparatus in accordance with claim 4 in which the second factors of the second sum are related to second factors of the first sum and further comprising:

inverter means having one of the switching pulses as an input and having corresponding inverted switching pulses as an output coupled as a control input of one of the switches.

6. The apparatus of claim 3 in which the input voltages represent the coordinates of a vector in a given coordinate system and the sum of the products represent the magnitude of the vector and further comprising:

at least one means for taking off a signal at the output of a limit indicator which represents the function of the angle of the vector, whereby said apparatus forms a vector analyzer.

7. The apparatus of claim 6 in combination with the field-oriented control of a rotating-field machine in which the stator-related coordinates of the magnetic flux vector are the inputs, the sum of the products represents the magnetic flux vector, and the outputs of the limit detectors are functions of the position angle of the vector.

8. The apparatus of claim 5 in which the input voltages represent the coordinates of a vector to be rotated, the switching pulses represent functions of the angle through which the vector is to be rotated, and the first and second sums represent the coordinates of the transformed vector whereby said apparatus forms a vector rotator.

9. The vector rotator of claim 8 in combination with the field-oriented control of a rotating-field machine in which the input voltages represent the stator-related coordinates of the current vector, the switching pulses represent the functions of the angle through which the vector is to be rotated, and the output sums represent the field-related components of the current vector.

* * * * *